United States Patent [19]
Pettersson et al.

[11] Patent Number: 5,011,340
[45] Date of Patent: Apr. 30, 1991

[54] DOUBLE-SIDED CUTTING INSERT

[75] Inventors: Lars T. Pettersson, Glen Rock, N.J.; Jörgen V. Wiman, Sandviken, Sweden

[73] Assignee: Sandvik AB, Sandviken, Sweden

[21] Appl. No.: 413,005

[22] Filed: Sep. 26, 1989

[30] Foreign Application Priority Data

Sep. 26, 1988 [SE] Sweden ............................. 8803389

[51] Int. Cl.$^5$ ............................................. B23C 5/02
[52] U.S. Cl. ....................................... 407/114; 407/115
[58] Field of Search .................................. 407/113–117

[56] References Cited

U.S. PATENT DOCUMENTS

| 4,312,250 | 1/1982 | Yankoff | 407/114 |
| 4,318,645 | 3/1982 | McCreery | 407/116 |
| 4,507,024 | 3/1985 | Stashko | 407/114 |
| 4,626,141 | 12/1986 | Malaker et al. | 407/114 |
| 4,685,844 | 8/1987 | McCreery et al. | 407/115 |

FOREIGN PATENT DOCUMENTS 0260238  9/1988  Fed. Rep. of Germany ...... 407/113

*Primary Examiner*—James G. Smith
*Assistant Examiner*—Jack Lavinder
*Attorney, Agent, or Firm*—Burns, Doane, Swecker & Mathis

[57] ABSTRACT

A double-sided insert includes upper and lower rake faces. The rake faces include chip faces lying on the uppermost and lowermost planes of the insert to respectively define a chip deforming face and a holder-engaging supporting face. Those rake faces are so located that the rake face(s) serving as a support face(s) is disposed closely adjacent the cutting edge to minimize stresses imposed on the insert during a cutting operation.

10 Claims, 6 Drawing Sheets

DOUBLE-SIDED CUTTING INSERT

BACKGROUND OF THE INVENTION

The present invention relates to a double-sided cutting insert for chipforming machining comprising a body of generally polygonal shape having essentially identical upper and lower rake faces, and side faces intersecting the upper and lower rake faces to form cutting edges, pairs of the side faces intersecting each other to form cutting corners. Each of the upper and lower rake faces is provided with a central recess.

A double-sided cutting insert for chipforming machining is disclosed in U.S. Pat. No. 4,312,250 in which each upper and lower rake face of the insert has a centrally raised portion lying in uppermost and lowermost planes of the insert for the purpose of functioning as a support surface when resting upon a mounting surface of a holder. The cutting edge and its adjacent chip face are spaced from the mounting surface of the holder and are unsupported therebelow whereby the insert is susceptible to failure when subjected to large tensile forces.

It is an object of the present invention to provide a double-sided cutting insert which exhibits maximum strength during machining.

It is another object of the present invention to provide such a cutting insert which has a plurality of cutting edges.

SUMMARY OF THE INVENTION

The present invention involves a double-sided cutting insert for chip forming machining. The insert comprises a generally polygonal body defining uppermost and lowermost planes. The body has upper and lower rake faces. Clearance spaces intersect the upper and lower rake faces to define on each of the rake faces a cutting edge extending between adjacent corners of the body. Each rake face includes a chip face adjacent the cutting edge and lying in an associated one of the uppermost and lowermost planes to define a chip deformer when in a cutting position and to define an insert support when facing a holder. Recessed surfaces extend inwardly from the chip faces toward a center of the insert.

The chip faces located in the uppermost and lowermost planes may comprise only corner chip breakers (with the main chip breakers being recessed), or a combination of corner chip breakers and main chip breakers which are coplanar with the corner chip breakers.

BRIEF DESCRIPTION OF THE DRAWING

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figures 1, 2:
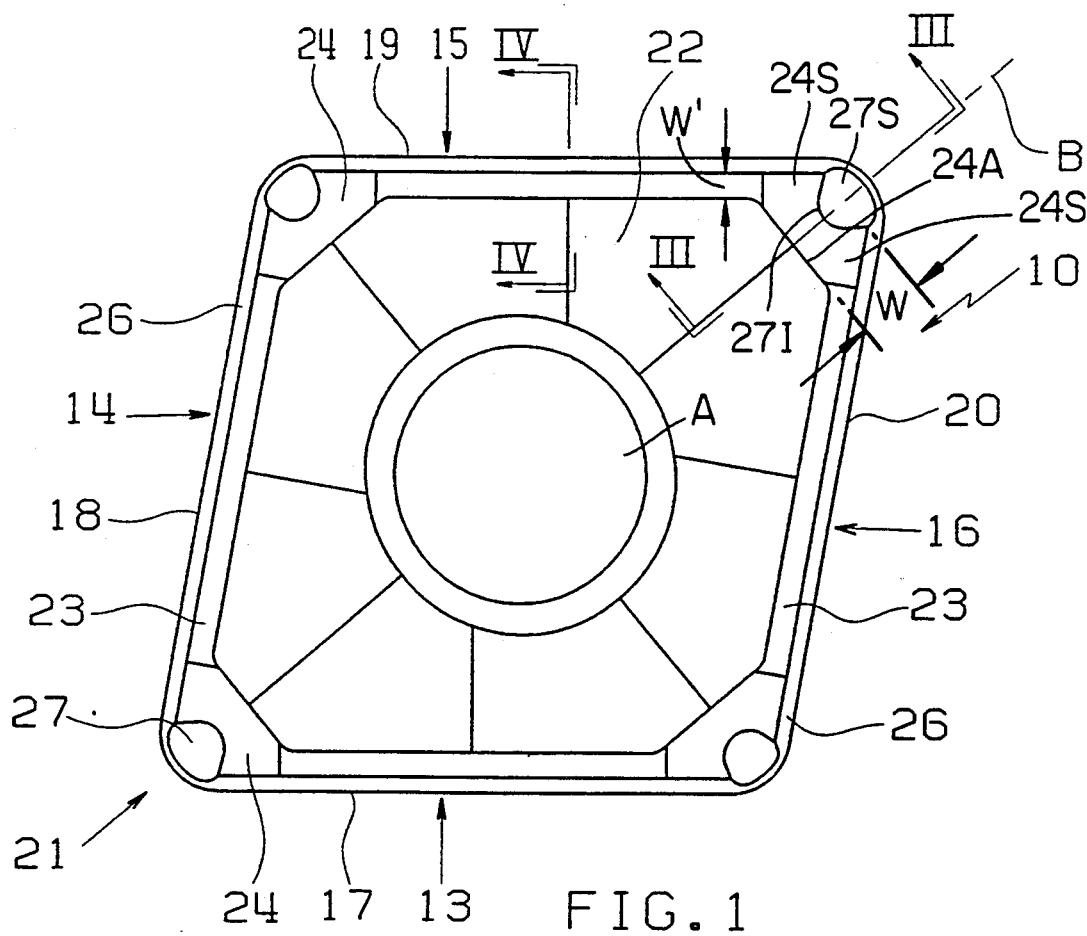
FIG. 1 is a plan view of a first embodiment of a cutting insert according to the invention.
FIG. 2 is a side elevational view of the insert of FIG. 1.
Figure 3:
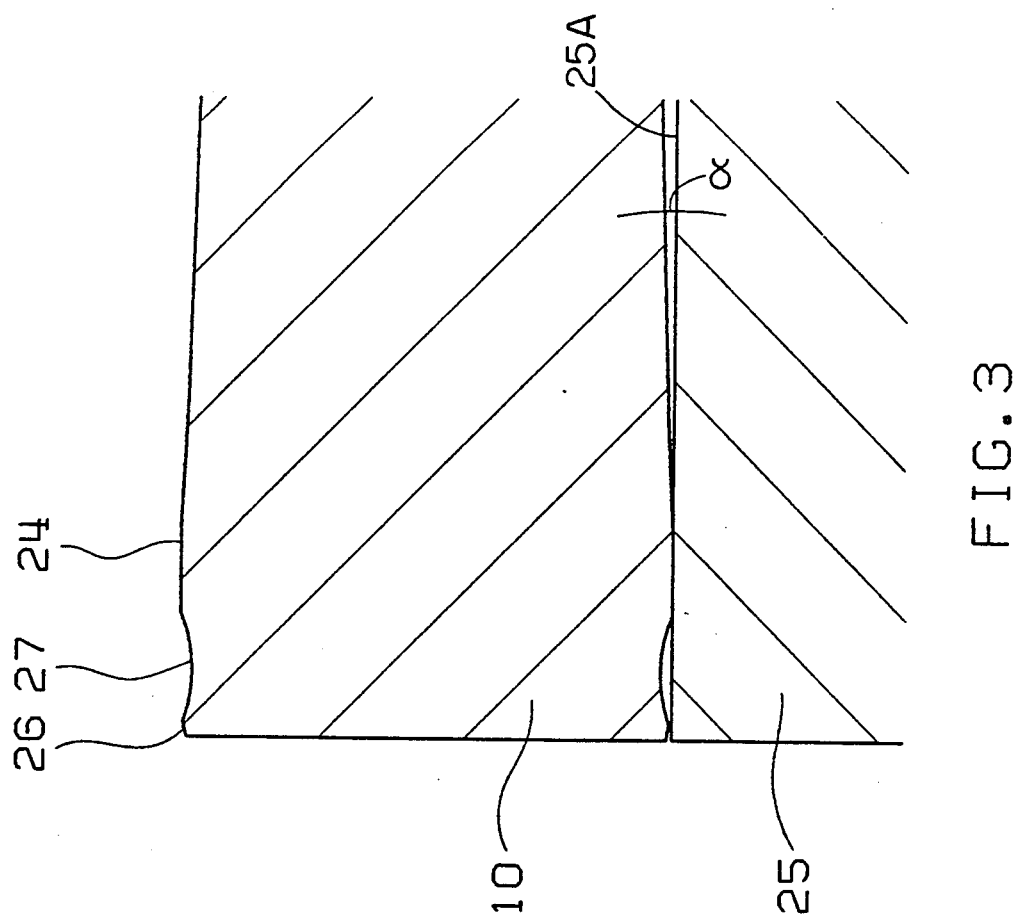
FIG. 3 is a partial cross-sectional view taken along the line III—III in FIG. 1, in which a portion of a holder is shown adjacent the insert.

FIGS. 1-5 show a first preferred embodiment of a two-sided cutting insert 10 according to the invention, preferably for a lathe-mounted cutting tool. The insert 10 is manufactured of a ceramic or cemented carbide or a similar hard material. The insert is in the form of a body of generally polygonal shape; in this case, a generally rhombic shape, and has a central aperture A for receiving a clamping fastener. The body defines uppermost and lowermost planes UP and LP. The insert includes an upper rake face 11 and an identical bottom rake face 12. The faces 11 and 12 intersect a series of contiguous side surfaces 13 to 16 to define cutting edges 17 to 20 along the periphery of the upper and bottom rake faces 11, 12. Pairs of the side surfaces 13-16 intersect one another at rounded cutting corners 21. Each cutting corner 21 has an imaginary bisector B. Each rake face includes a beveled edge 26 which extends completely around the rake face and intersects the side surfaces to define the cutting edges. The beveled edge 26 forms an obtuse angle with the corner chip faces. A plurality of main chip faces 23 extend along respective ones of the cutting edges inside of the beveled edge. Disposed at each corner of the insert inwardly of the beveled edge is a corner chip face 24. Disposed inwardly of the main chip faces and corner chip faces are recessed surfaces 22 which slope downwardly and inwardly at an angle $\alpha$ from the edge chip faces 23 and corner chip faces 24 (see FIG. 4). That angle $\alpha$ is in the range of from about 0.5° to 8.0°. The chip faces 23 function to deform or upset chips during machining.

The corner chip faces 24 lie in the associated plane UP or LP. Each corner chip face 24 is oriented perpendicular to the adjacent side surfaces 13-16 and is intended, in an active or cutting position to deform or upset chips in a manner similar to the main chip face 23.

Figure 4:
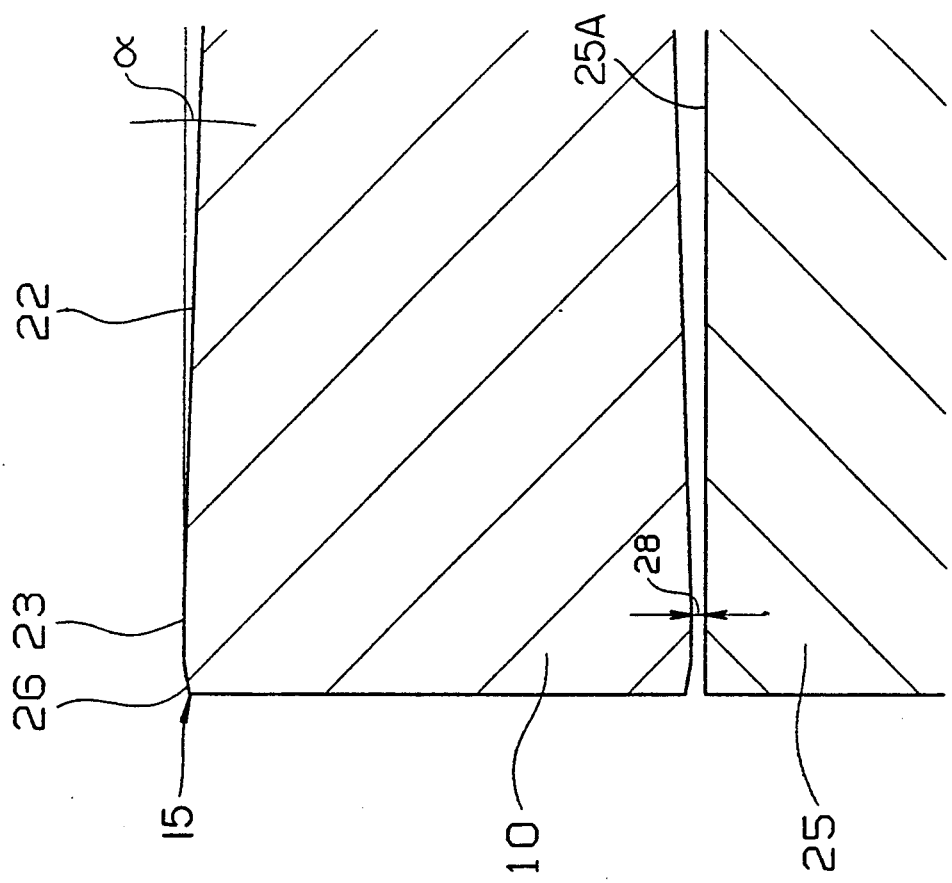
FIG. 4 is a partial cross-sectional view taken along the line IV—IV in FIG. 1, in which a portion of a holder is shown adjacent the insert.

The main chip faces 23 are of concave shape (i.e., the deepest point on each surface 23 lies midway between adjacent corners of the insert) so that when the associated rake face serves as a supporting surface, a gap 28 is formed between the mounting surface 25A of the holder and the chip face 23 of such rake face (see FIG. 4). This gap 28 is preferably about 0.05 to 0.5 mm. Each of the corner chip faces 24 is symmetrically arranged in relation to a bisector B of the adjacent cutting corner 21. The largest width W of the corner chip face 24 in a direction parallel to the bisector B is larger than the largest width W' of the main chip face 23 in a direction perpendicular to the adjacent cutting edge. Each of the cutting corners 21 is provided with a depression 27 which is arranged symmetrically in relation to the bisector B of that corner. This depression 27 intersects the beveled face 26 and extends inwardly from the beveled face so as to occupy about half of the distance from the beveled face 26 to the inner edge 24A of the corner chip portion 24 along the bisector. The largest dimension of the depression perpendicular to the bisector is less than the largest dimension of the corner chip face in the same direction. Each depression 27 includes side sections 27S spaced on opposite sides of the bisector B. The corner chip face 24 includes a pair of side portions 24S which extend along those side sections 27S of the depression. The side portions 24S are thus located closer to the respective corner portion of the cutting edge than is an innermost end 27I of the depression.

Figure 5:
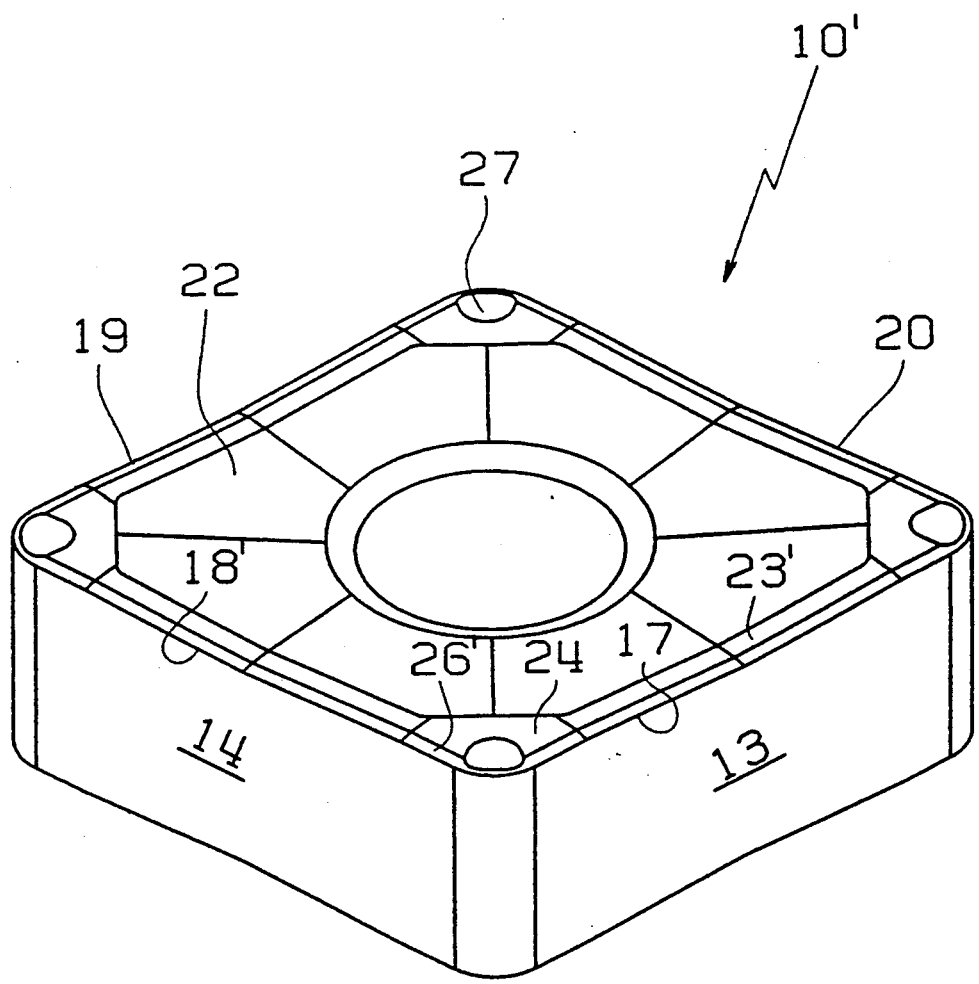
FIG. 5 is a top perspective view of a third embodiment of the insert.

FIG. 5 depicts a modified insert 10' in which the main chip faces 23' and the beveled edges 26' are of generally V-shaped configuration, while the corner chip breakers 24 remain coplanar in the uppermost or lowermost plane. The cutting edges 18' are thus V-shaped.

Figure 6:
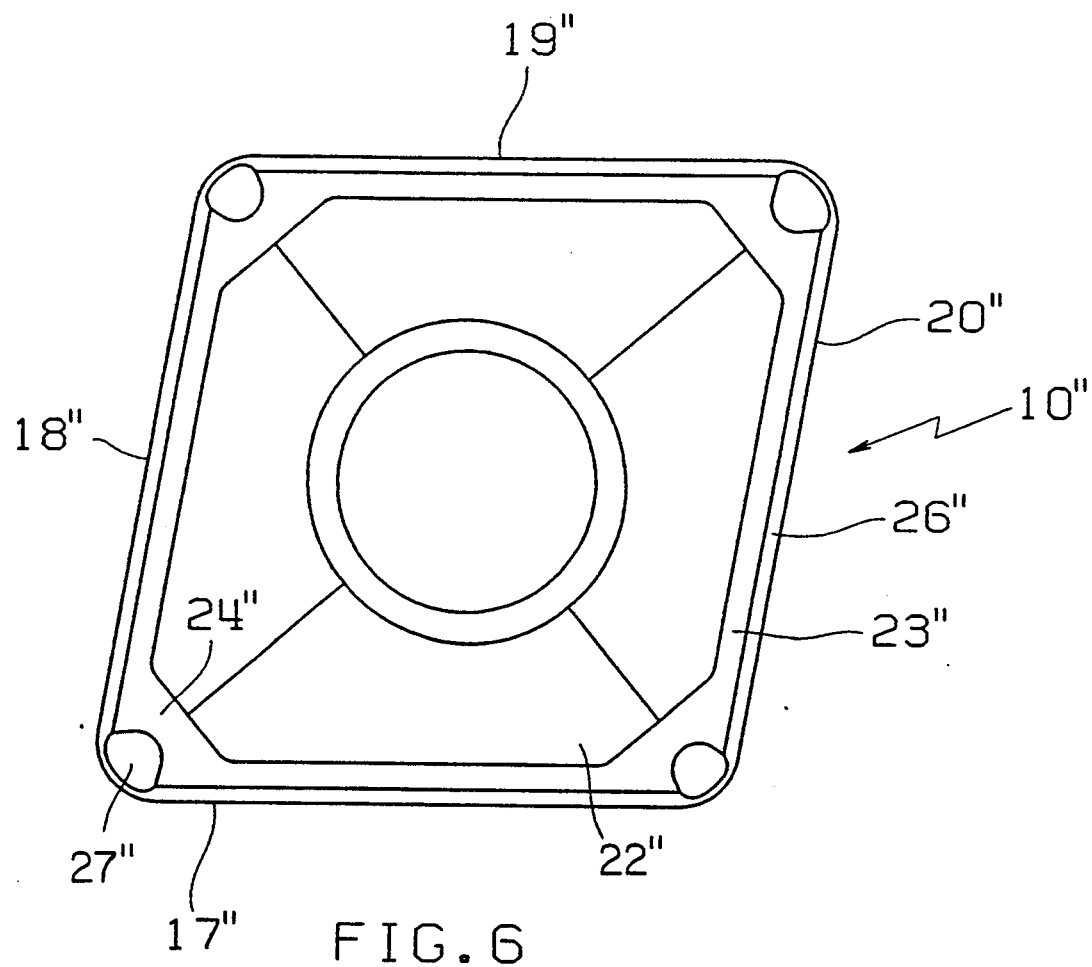
FIGS. 6 and 7 show a third embodiment of an insert according to the invention in plan view and side elevational view, respectively.
Figure 7:
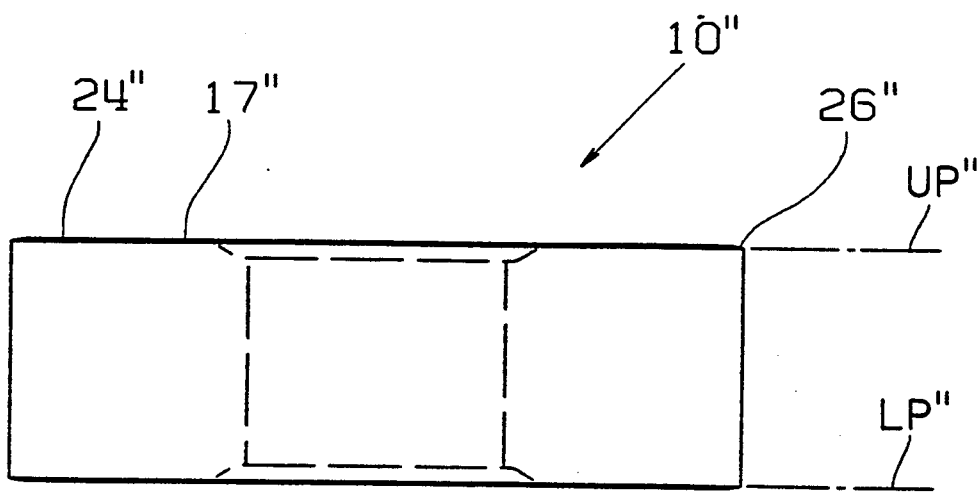

FIGS. 6 and 7 illustrate a third preferred embodiment of an insert 10" of this invention. That insert has a shape identical with the earlier-described insert 10 with the exception, however, that the corner chip faces 24" and the main chip faces 23" are coplanar and located in the associated upper or lower plane UP" and LP" and are thus oriented perpendicular to the side surfaces. The insert 10" will thus abut against a holder support surface 25A along the entire periphery of the insert whereby the support surfaces of the insert are arranged in a favorable position close to the cutting edge for minimizing the risk of insert cracking.

The insert 10, 10', and 10" of this invention is preferably provided with the negative beveled face 26, 26', and 26" in those cases when the insert is made of ceramics or a corresponding material susceptible to tensile forces. If the insert is instead to be made of cemented carbide, the edge chip faces 23'" and corner chip faces 24'" preferably directly intersect the clearance surfaces 17-20, as depicted in FIG. 8.

The inserts can also be provided with projections in the chip faces of the type described in U.S. application Ser. No. 07/409,944 filed Sept. 19, 1989 by L. Pettersson and J. Wiman, the disclosure of which is herein incorporated by reference.

Figure 8:
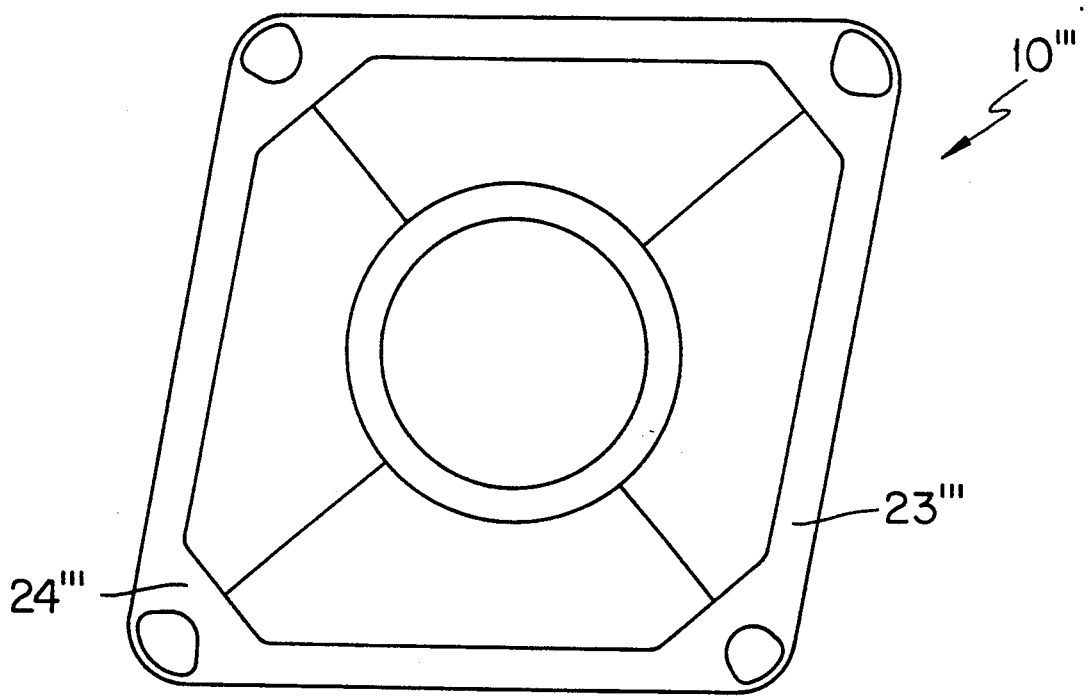
FIG. 8 is a view similar to FIG. 6 of a third embodiment of the invention.

The present invention thus relates to a double-sided insert for chipforming machining of the type wherein the insert has dual function chip faces, i.e., faces 24 in FIG. 1; faces 24' in FIG. 5; faces 23" and 24" in FIG. 6; and faces 23'" and 24'" in FIG. 8 which serve as either chip deformers (when in a cutting position) or insert supporters (when facing a holder). The insert support forces are located close to the cutting edge, whereby the risk of cracking failure is minimized.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A double-sided cutting insert for chipforming machining comprising a generally polygonal body defining uppermost and lowermost planes, said body having upper and lower rake faces, clearance face means intersecting said upper and lower rake faces to define on each of said rake faces cutting edge means extending between adjacent corners of the body, each rake face including a plurality of corner chip faces located at respective corners of said insert and lying in an associated one of said uppermost and lowermost planes to define a chip deformer when in a cutting position and to define an insert support when facing a holder, and recessed surface means extending inwardly from said corner chip faces toward a center of the insert and being recessed relative to respective ones of said uppermost and lowermost planes, each rake face further including main chip faces disposed along respective ones of said cutting edges and being recessed relative to said corner chip faces.

2. An insert according to claim 1 including a depression at each said corner between said corner chip face and said cutting edge means.

3. An insert according to claim 1 including beveled face means extending inwardly from said cutting edge means, said corner chip faces and said main chip faces extending inwardly from said beveled face means at an obtuse angle relative thereto.

4. An insert according to claim 1, wherein said body is generally of rhombic shape and formed of a ceramic material.

5. An insert according to claim 1, wherein each of said rake faces includes a center hole for receiving a fastener, said hole disposed inwardly of said recessed surface means.

6. A double-sided, multi-cornered cutting insert for chipforming machining comprising a generally polygonal body defining uppermost and lowermost planes, said body having upper and lower rake faces and clearance face means intersecting said upper and lower rake faces to define cutting edge means on each of said rake faces, said cutting edge means including corner portions situated at respective corners of the insert, each rake face including a plurality of corner chip faces located adjacent respective corners, said corner chip faces lying in a common plane coinciding with a respective one of said uppermost and lowermost planes whereby said corner chip faces define chip deformers when in a cutting position and define insert supports when facing a holder, a depression disposed adjacent each said corner and situated between a respective corner chip face and a respective corner cutting edge portion, and recessed surface means extending inwardly from said corner chip faces and said main chip faces toward a center of the insert and being recessed relative to associated ones of said uppermost and lowermost planes, each depression including side sections situated on opposite sides of a bisector of a respective corner, the respective corner chip face including side portions extending along said side section of said depression whereby said side portions of said corner chip face are located closer to the respective corner cutting edge portion than is an innermost end of the depression.

7. An insert according to claim 6, wherein said cutting edge means includes main cutting edge portions extending between said corners, each rake face including main chip faces disposed along respective ones of said main cutting edge portions and being coplanar with said corner chip faces.

8. An insert according to claim 7, wherein each of said rake faces includes beveled face means extending inwardly from said cutting edge means, said corner chip faces and said main chip faces extending inwardly from said beveled face means at an obtuse angle relative thereto.

9. An insert according to claim 8, wherein said beveled face is thinner at a location adjacent a corner of said insert than at a location remote from said corner.

10. An insert according to claim 6, wherein said corner chip faces and said main chip faces intersect said clearance face means.

* * * * *